Nov. 24, 1953   H. M. GEYER   2,660,026
DUAL DRIVE ACTUATOR
Filed Dec. 5, 1952

INVENTOR.
HOWARD M. GEYER
BY
*Willits, Hardman and Felix*
ATTORNEYS

Patented Nov. 24, 1953

2,660,026

UNITED STATES PATENT OFFICE 2,660,026

DUAL DRIVE ACTUATOR

Howard M. Geyer, Dayton, Ohio, assignor to General Motors Corporation, Detroit, Mich., a corporation of Delaware Application December 5, 1952, Serial No. 324,273

20 Claims. (Cl. 60—6)

The present invention relates to actuators and more particularly to actuators adapted to be operated by two separate motivating means.

In actuators designed for operating control surfaces and other aircraft equipment, the desirability of providing two independent motivating means for operating the actuator is obvious. In addition, aircraft actuators preferably embody releasable locking means, automatically operable to maintain the movable actuator element, and perforce the load device associated therewith, at a fixed position when the motivating means are inactive. The instant actuator employs fluid under pressure as a primary motivating means and electromotive force as the secondary or auxiliary motivating means. The auxiliary motivating means is only utilized if and when the primary motivating means fails or is otherwise rendered inoperative. Accordingly, one of my objects is to provide a locking actuator with primary and secondary means for effecting operation thereof.

The aforementioned and other objects are accomplished in the present invention by releasing the locking means upon actuation of the primary motivating means, and maintaining the locking means effective or engaged upon actuation of the auxiliary motivating means.

Specifically, the actuator includes a cylinder and a piston mounted for linear movement therein in either direction. The piston includes a rod that projects through an end wall of the cylinder, the rod being adapted for connection to either a relatively fixed support or a relatively movable load device. The opposite end wall of the cylinder is likewise adapted for connection to either the support or the load device, such that upon relative movement between the piston and cylinder, the load device will be positioned. A nut is rotatably journaled within the cylinder, the nut constituting a component of the well-known ball-screw and nut assembly, of which the screw shaft is rotatably journaled in the piston though movable lineally therewith. The screw shaft threadedly engages the nut through the agency of a plurality of circulating balls, such that relative rotation will occur between the nut and screw shaft upon reciprocable movement of the piston.

The piston is formed as a cup-shaped member to accommodate one end of the screw shaft which is journaled for rotation therein. In order to accomplish the objective of locking the load device in a fixed position when the motivating means are inactive, the hollow screw shaft is formed with an internally straight splined portion which always engages a straight splined rod journaled for rotation in an end wall of the cylinder. The end of the rod is formed as a brake disc adapted for longitudinal movement into and out of engagement with an immovable friction surface. The locking means, constituted by the brake disc and the friction surface, are normally maintained engaged or operative by resilient means to prevent rotation of the screw shaft. The nut is restrained from rotation at all times when the auxiliary motivating means, operatively connected thereto, is inactive. A fluid pressure operated lock release piston is employed to relieve the thrust of the resilient means to facilitate disengagement of the brake disc and the friction surface upon application of pressure fluid to the actuator cylinder.

During fluid pressure operation of the actuator, the locking means are preferably released concurrently with the application of pressure fluid to either of the cylinder chambers. As the nut is restrained from rotation when the auxiliary motivating means are inactive, linear movement of the piston in either direction may be affected by pressure fluid inasmuch as the screw shaft is free to rotate relative to the nut and piston. If, for any reason, the fluid pressure system should become inoperative, the actuator piston and load device may be adjusted by operation of the auxiliary motivating means constituted by a reversible electric motor. Upon energization of the motor, and while the locking means are engaged, the nut may be rotated in either direction by the motor. Accordingly, relative rotation will ensue between the nut and the screw shaft, thereby effecting linear movement of the shaft and piston as an assembly relative to the cylinder.

Further objects and advantages of the present invention will be apparent from the following description, reference being had to the accompanying drawing, wherein a preferred embodiment of the present invention is clearly shown.

Figure 1:
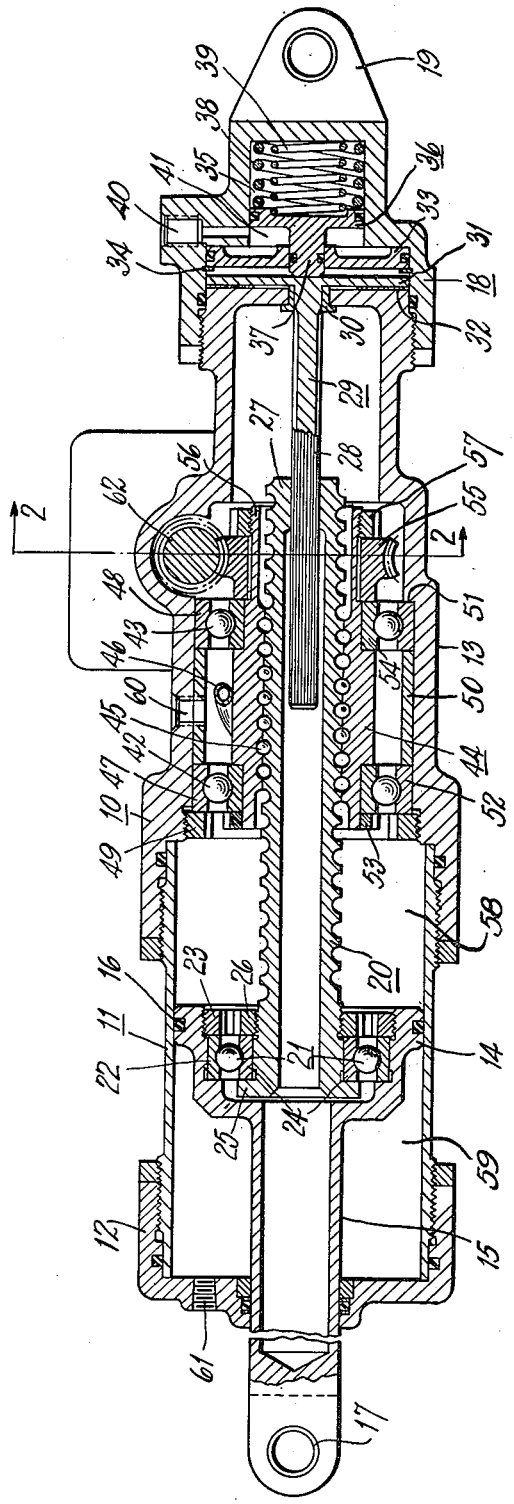
Fig. 1 is a longitudinal view, partly in section and partly in elevation, of a dual drive actuator, taken on the line 1—1 of Fig. 2.

With particular reference to Fig. 1, an actuator designated by the numeral 10, is shown including a cylinder 11 having attached thereto end cap members 12 and 13. Disposed within the cylinder 11 is a piston 14 having an axially extending rod 15 projecting through cap member 12. End cap members 12 and 13 threadedly engage opposite ends of a tubular member constituting the side walls of the cylinder 11. Suitable resilient seals are interposed between contiguous surfaces of the cap members and the tubular member forming the side walls of the cylinder to prevent leakage of fluid from the interior of the cylinder. The piston 14 is likewise provided with a seal 16 which insures fluid tight engagement between the circumferential surface of the piston and the inner surface of the cylinder walls defined by the tubular member.

The free end of the piston rod 15 has a fixture 17 attached thereto which is adapted for connection to either a relatively fixed support or a movable load device, not shown. Suitable sealing means are provided between the apertured end cap member 12 and the projecting piston rod 15. Cap member 13 has threadedly attached thereto a housing 18 having a fixture 19 likewise adapted for connection to either a relatively fixed support or a movable load device. In the instant disclosure, it is preferred to connect fixture 19 to the fixed support and the fixture 17 to the movable load device for a reason which will appear more fully hereinafter.

The piston 14 is generally of cup-shape configuration. Within the cup-shaped portion of the piston, a hollow screw shaft 20, having a spiral groove thereof of substantially semi-circular configuration, is rotatably journaled by bearing means 21. The outer race 22 of bearing means 21 is retained in position between an internal shoulder of the piston 14 and a ring 23 which threadedly engages a portion of the piston. The inner race 24 of the bearing 21 is retained in position between a shoulder 25 formed adjacent one end of the screw shaft and a ring 26 threadedly engaging a portion of the screw shaft. The opposite end of the hollow screw shaft 20 has a portion 27 thereof having longitudinally extending straight splines on its inner periphery. The straight splined portion 27 always engages the straight splined external periphery 28 of a rod 29 which extends longitudinally within the cap member 13. The rod 29 is rotatably journaled in the end cap member 13 by means of a sleeve bearing 30, the rod 29 projecting through the end cap member 13 and being formed as a brake disc 31 externally of the cap member. The brake disc is disposed in the space between the hollow housing member 18 and the end cap 13 and is free to move longitudinally relative to the end cap and the housing 18. The rod 29 is coaxially disposed with regard to both the screw shaft 20 and the cylinder 11 such that when the rod 29 is free to rotate, the screw shaft 20 may move axially relative thereto by reason of the straight spline connection therebetween. The brake disc 31 is adapted for engagement with an immovable annular friction surface 32 attached to the external surface of the cap member 13. The brake disc 31 and the friction surface 32 constitute the locking means for maintaining the actuator piston 14 in a fixed position. When the brake disc 31 is maintained in engagement with the friction surface 32, rotation of the screw shaft is precluded. It is to be understood that any type of locking means may be used, such as a dog tooth arrangement, and the friction type locking means disclosed is only to be construed by way of example and not by way of limitation.

In order to effect movement of the brake disc 31 relative to the friction surface 32, the following means are provided. Within the hollow housing 18 a centrally apertured disc 33 is disposed. The disc 33 sealingly engages the internal periphery of the housing 18 and is rigidly retained in position between an internal shoulder of the housing 18 and a snap ring 34 situated in a groove in the internal periphery of the housing 18. The disc 33 constitutes an end wall of the lock release cylinder 35 within which a lock release piston 36 is mounted for reciprocable movement. The piston 36 has an axially extending rod portion 37 which projects through the central opening in the disc 33, in fluid tight engagement therewith, and abuts the brake disc 31. A pair of nested compression springs 38 and 39 disposed within the lock release cylinder 35 on one side of the piston 36, normally urge the piston 36 to the left as viewed in Fig. 1 so that the piston rod 37 moves the brake disc 31 into engagement with the friction surface 32. Thus, the locking means are normally maintained operative by resilient means. In order to release the locking means, a lock release port 40 is provided in the housing 18 through which pressure fluid may be admitted to lock release chamber 41 which moves the piston 36 to the right as viewed in the drawing, thereby relieving the thrust of the resilient means from the brake disc 31 and permitting rotary movement of the brake disc 31 relative to the friction surface 32. It is to be understood that suitable sealing means are provided to insure fluid tight engagement between the walls of the lock release cylinder 35 and the contiguous surfaces of the lock release piston 36.

Rotatably mounted within end cap 13 by bearing means 42 and 43 is a tubular nut 44. The inner periphery of the nut 44 has formed thereon a spiral groove of substantially semi-circular configuration, the nut forming one element of the ball-screw and nut connection to be described. The screw shaft 20 threadedly engages the nut 44 through the agency of a plurality of balls 45, thereby affording a substantially frictionless coupling therebetween. A tubular member 46 attached to the nut 44 is utilized as a circulation passage for the balls 45 during relative rotary movement between the nut and screw shaft. The nut 44, the shaft 20 and the balls 45 constitute the well-known ball-screw and nut coupling. The outer races 47 and 48 of bearing means 42 and 43, which journal the nut within the cap member 13, are retained in position by a ring 49 threadedly engaging a portion of the cap 13, a sleeve 50 and an internal shoulder 51 formed on the cap member 13. The inner race 52 of bearing 42 is retained in position between a shoulder formed on the nut and a ring 53 threadedly engaging a portion of the nut, while the inner race 54 of bearing 43 is retained in position between a shoulder formed on the nut and a worm gear 55 keyed or otherwise suitably connected to an axially extending annular portion 56 of the nut. The worm gear 55 is retained in position by means of a ring 57 threadedly engaging the annular portion 56 of the nut.

The piston 14 divides the cylinder 11 into an extend chamber 58 and a retract chamber 59, the extend chamber 58 having connection with a port 60 formed within the cap member 13 and the retract chamber having connection with a port 61 formed within the cap member 12. Any suitable valve means, not shown, such as the type disclosed in copending application, Serial No. 338,348, filed February 24, 1953, which application is a continuation of forfeited application, Serial No. 258,938, filed November 29, 1951, in the name of James W. Light, may be utilized to control the flow of pressure fluid to and from the actuator chambers as well as to the lock release cylinder chamber 41. Preferably, though not necessarily, pressure fluid is admitted concurrently to the lock release cylinder and either the retract or extend actuator chambers so that the screw shaft 20 is freed for rotation relative to the piston 14 and the nut 44 whereby linear movement of the piston 14, under the urge of pressure fluid, may be effected.

Figure 2:
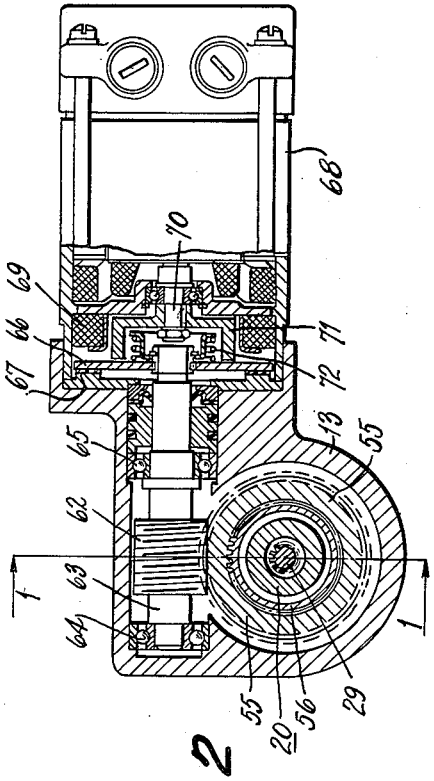
Fig. 2 is a view, partly in section and partly in elevation, taken on the line 2—2 of Fig. 1.

With particular reference to Fig. 2, the worm gear 55 meshes with a worm 62 which is anchored to a shaft 63 journaled by bearing means 64 and 65 within the cap member 13. The shaft 63 has attached thereto at one end a disc 66 which is composed of magnetic material and forms a component part of a magnetic clutch to be described. The disc 66 is keyed to the shaft 63 such that relative rotation between the disc and the shaft is precluded, but the disc may move axially relative to the shaft. One side of the magnetic clutch is frictionally engageable with a braking disc 67 secured within a portion of the cap member 13. The braking disc is restrained from rotation. A reversible electric motor is disposed within a housing 68 attached to the end cap 13. Also disposed within the housing 68 is an electromagnet 69. The construction of the motor and electromagnetic clutch assembly is more particularly disclosed in my copending application, Serial No. 247,737, filed September 21, 1951, now Patent No. 2,620,683, issued December 9, 1952, and suffice it here to say that the rotatable shaft 70 of the electric motor has a cup-shaped element 71 attached thereto which is rotatable within the magnetic field established by the electromagnet 69. When the electric motor within the housing 68 is deenergized by any suitable switch means, not shown, the electromagnet 69 is likewise deenergized and spring 72 will urge the magnetic disc 66 away from the cup-shaped member 71 into frictional engagement with the braking disc 67. Thus, when the motor is deenergized, shaft 63 is restrained against any rotative movement, the shaft 63 thereby preventing rotative movement of the nut 44 within the actuator cylinder at all times when the electric motor is inactive. When the electric motor and the electromagnet are simultaneously energized, the magnetic field created by the electromagnet will attract the magnetic disc 66 rotatably secured to the shaft 63, and the disc 66 will move into engagement with the cup member 71 which is being rotated by the electric motor. Rotation of the disc 66 by the cup member 71 will be imparted to the shaft 63 and the nut 44 through the gear train constituted by the worm 62 and the worm gear 55.

*Operation*

As heretofore mentioned, fluid under pressure is utilized as the primary motivating means while the electric motor is only utilized if and when the fluide pressure system, not shown, for operating the actuator, is rendered inoperative. During fluid pressure operation of the actuator, fluid under pressure is preferably concurrently admitted to one of the actuator chambers and the lock release chamber 41, while the other actuator chamber is exposed to drain. When fluid under pressure is admitted to the lock release chamber 41, the piston 36 will move to the right as viewed in the drawing, thereby relieving the thrust of the resilient means from the disc 31 and permitting rotation of the rod 29 and the screw shaft 20 relative to the cylinder 11. Accordingly, when pressure fluid is admitted to either the retract chamber 59 or the extend chamber 58, the piston 14 will undergo linear movement relative to the cylinder 11 by reason of the concurrent application of pressure to one side thereof and the exposure of the other side thereof to drain. Linear movement of the piston is permitted inasmuch as the screw shaft 20 is free to rotate relative to the then fixed nut 44, relative rotation between the nut and screw shaft permitting linear movement of the screw shaft and piston as an assembly. As soon as the valve means, not shown, are actuated to stop the flow of pressure fluid to either of the actuator chambers, lock release chamber 41 is exposed to drain whereby springs 38 and 39 will move the piston 36 to the left as viewed in Fig. 1 and the rod 37 will again impose the thrust of these springs upon the brake disc 31 such that engagement between the brake disc 31 and the friction surface 32 will preclude rotation of the rod 29 and the screw shaft 20. Accordingly, relative rotation between the nut 44 and the piston 14 is precluded, inasmuch as the piston 14 cannot rotate within the cylinder by reason of its rod being connected to a movable load device and the nut 44 is restrained from rotation by the deenergized electromagnetic clutch heretofore alluded to. In the instant design, it is preferred to connect the fixture 19 to a relatively fixed support in that hydraulic connections must be made through housing 18.

Should the fluid pressure system become inoperative for any reason, the actuator piston 14 may be reciprocated by energization of the electric motor. When the electric motor is energized, the electromagnetic clutch is likewise energized and rotation will be imparted to the shaft 63, which rotation is transmitted through the worm 62 and the worm gear 55 to the nut 44. As the locking means, constituted by the brake disc 31 and the friction surface 32, are now in engagement, relative rotation between the nut 44 and the then nonrotatable screw shaft 20 will effect linear movement of the piston and screw shaft as an assembly relative to the cylinder 11, the direction of movement being dependent upon the direction of rotation of the nut 44. Thus, a reversible motor is conveniently used to effect rotation of the nut 44 in either direction. However, it is to be understood that a unidirectional electric motor could be used if reversible gearing means were provided.

With an actuator of the present design, it is readily apparent that, in the absence of fluid pressure application to the cylinder, and while the electric motor is deenergized, movements of the piston 14 relative to the cylinder 11 are prevented by the operative locking means. When fluid under pressure is used as the motivating means, the locking means must be released to permit rotation of the screw shaft relative to the nut and the piston. However, when the electric motor is used as the motivating means, the locking means must be engaged or locked to permit rotation of the nut relative to the screw shaft 20. It is further apparent that reciprocable movement of the piston within the cylinder can only be effected by relative rotary movement between the nut and screw shaft.

While the embodiment of the present invention as herein disclosed constitutes a preferred form, it is to be understood that other forms might be adopted.

What is claimed is as follows:

1. A dual drive actuator including, in combination, a cylinder, a piston in said cylinder capable of fluid pressure actuation in either direction, releasable locking means operatively associated with said piston for preventing movement of said piston when no fluid pressure is exerted thereon, and auxiliary driving means operatively connected to said piston for effecting linear movement thereof in either direction with the locking means in the locked condition.

2. A dual drive actuator including, in combination, a cylinder, a piston in said cylinder capable of fluid pressure actuation in either direction, locking means operatively associated with said piston for preventing movement of said piston when no fluid pressure is exerted thereon, means for releasing said locking means upon application of fluid pressure to said cylinder, and auxiliary driving means operatively connected to said piston for effecting linear movement thereof in either direction with the locking means in the locked condition.

3. A dual drive actuator including, in combination, a cylinder, a lineally movable piston in said cylinder capable of fluid pressure actuation in either direction, a first member disposed in said cylinder and operatively connected to said piston, a second member operatively engaging said first member, said first and second members being adapted for rotation relative to each other upon linear movement of said piston, releasable locking means operatively associated with said piston for preventing linear movement of said piston when no fluid pressure is exerted theeron, and auxiliary driving means operatively connected to said piston through said members for effecting linear movement of said piston in either direction, said auxiliary means, when inactive, maintaining said locking means operative and, when active, operative to rotate one of said members with the locking means in the locked condition.

4. A dual drive actuator including, in combination, a cylinder having a lineally movable piston disposed therein capable of fluid pressure actuation in either direction, releasable locking means operatively associated with said piston for preventing movement of said piston when no fluid pressure is exerted thereon, and auxiliary driving means operatively connected to said piston for effecting linear movement thereof in either direction in lieu of fluid pressure actuation, the operative connection between said piston and said auxiliary means including a hollow member disposed in said cylinder for rotation relative to said piston, the said locking means in the locked condition, and a member disposed in said cylinder extending longitudinally through and operatively engaging said hollow member whereby relative rotation will occur between said members upon linear movement of said piston, said driving means, when inactive, maintaining said locking means operative to prevent piston movement and, when active, operative to rotate one of said members.

5. A dual drive actuator including, in combination, a cylinder having a lineally movable piston disposed therein capable of fluid pressure actuation in either direction, releasable locking means operatively associated with said piston for preventing movement of said piston when no fluid pressure is exerted thereon, and auxiliary driving means operatively connected to said piston for effecting linear movement thereof in either direction in lieu of fluid pressure actuation, the operative connection between said piston and said auxiliary means including a hollow member disposed in said cylinder for rotation relative to said piston, the said locking means in the locked condition, and a member disposed in said cylinder extending longitudinally through and operatively engaging said hollow member whereby relative rotation will occur between said members upon linear movement of said piston.

6. A dual drive actuator including in combination, a cylinder having a lineally movable piston disposed therein capable of fluid pressure actuation in either direction, locking means operatively associated with said piston for preventing movement of said piston when no fluid pressure is exerted thereon, means operative upon application of fluid pressure to said cylinder for releasing said locking means, and auxiliary driving means operatively connected to said piston for effecting linear movement thereof in either direction in lieu of fluid pressure actuation, the operative connection between said piston and said auxiliary means including a hollow member disposed in said cylinder for rotation relative to said piston, the said locking means in the locked condition, and a member disposed in said cylinder extending longitudinally through and operatively engaging said hollow member whereby relative rotation will occur between said members upon linear movement of said piston, said driving means, when inactive, maintaining said locking means operative to prevent piston movement in the absence of fluid pressure application to said cylinder, and, when active, operative to rotate one of said members.

7. A dual drive actuator including in combination, a cylinder having a lineally movable piston disposed therein capable of fluid pressure actuation in either direction, releasable locking means operatively associated with said piston for preventing movement of said piston when no fluid pressure is exerted thereon, a first element attached to said piston and projecting through one end wall of said cylinder, a second element attached to the other end wall of said cylinder, one of said elements being constructed and arranged for connection to a relatively fixed support, the other of said elements being constructed and arranged for connection to a relatively movable load device whereby relative linear movement between said piston and said cylinder will effect adjustment of said load device, and auxiliary driving means operatively connected to said piston for effecting linear movement thereof in either direction in lieu of fluid pressure actuation, the operative connection between said piston and said auxiliary means including a hollow member disposed in said cylinder for rotation relative to said piston, the said locking means in the locked condition, and a member disposed in said cylinder extending longitudinally through and operatively engaging said hollow member whereby relative rotation will occur between said members upon linear movement of said piston, said driving means, when inactive, maintaining said locking means operative to prevent piston movement and, when active, operative to rotate one of said members.

8. An actuator including in combination, a cylinder, a lineally movable piston in said cylinder capable of fluid pressure actuation in either direction, a hollow member rotatably journaled in said cylinder and operatively connected to said piston, the operative connection between the piston and the member including an element rotatably journaled in said piston and extending longitudinally through said hollow member such that relative rotation will occur between said member and said element in response to linear movement of said piston, releasable locking means operatively connected with the piston for holding said piston against movement when no fluid pressure is exerted upon said piston by restraining rotation of said element, and auxiliary driving means operatively connected with said member for effecting linear movement of said piston in either direction, said auxiliary means, when inactive, maintaining said locking means operative to prevent piston movement by restraining rotation of said member and, when active, operative to effect piston movement with the locking means in the locked condition by rotating said member.

9. A dual drive actuator including in combination, a cylinder having a lineally movable piston disposed therein capable of fluid pressure actuation in either direction, releasable locking means operatively associated with said piston for preventing movement of said piston when no fluid pressure is exerted thereon, and auxiliary driving means operatively connected to said piston for effecting linear movement thereof in either direction in lieu of fluid pressure actuation, the operative connection between said piston and said auxiliary means including an internally threaded hollow member disposed in said cylinder for rotation relative to said piston, the said locking means in the locked condition, and a member disposed in said cylinder extending longitudinally through and threadedly engaging said hollow member whereby relative rotation will occur between said members upon linear movement of said piston, said driving means, when inactive, maintaining said locking means operative to prevent piston movement and, when active, operative to rotate one of said members.

10. A dual drive actuator including in combination, a cylinder having a lineally movable piston disposed therein capable of fluid pressure actuation in either direction, releasable locking means operatively associated with said piston for preventing movement of said piston when no fluid pressure is exerted thereon, and auxiliary driving means operatively connected to said piston for effecting linear movement thereof in either direction in lieu of fluid pressure actuation, the operative connection between said piston and said auxiliary means including an internally threaded nut journaled in said cylinder for rotation relative to said piston, the said locking means in the locked condition, and an externally threaded shaft disposed in said cylinder and connected to said piston, said shaft extending longitudinally through and threadedly engaging said nut whereby relative rotation will occur between said nut and shaft upon linear movement of said piston, said driving means, when inactive, maintaining said locking means operative to prevent relative rotation between said nut and shaft when the locking means are in the locked condition and, when active, operative to rotate said nut.

11. A dual drive actuator including in combination, a cylinder, a reciprocable piston disposed in said cylinder capable of fluid pressure actuation in either direction, an element rotatably journaled in said cylinder and operatively connected with said piston, the operative connection between said element and said piston including means journaled for rotation relative to both the piston and the cylinder, locking means operatively connected with said means for preventing rotation thereof and consequently holding said piston against movement when no fluid pressure is exerted upon said piston, means for releasing said locking means upon application of fluid pressure to said cylinder, the arrangement being such that relative rotation will occur between said element and said first recited means upon reciprocable movement of said piston, and auxiliary means operatively associated with said element for effecting relative rotation between said element and said first recited means with the locking means in the locked condition and consequently effecting reciprocative movements of said piston in lieu of fluid pressure actuation, said auxiliary means, when inactive, restraining rotation of said elements to maintain the locking means operative to prevent piston movement when no fluid pressure is exerted upon said piston.

12. The combination set forth in claim 11 wherein the auxiliary means comprises a reversible electric motor.

13. The combination set forth in claim 11 wherein the first recited means includes a shaft rotatably journaled in said piston, and a rod connected with said shaft such that relative rotation between said shaft and rod is precluded, but relative lineal movement between said shaft and rod is permitted.

14. The combination set forth in claim 13 wherein the locking means includes engageable and relatively movable brake members, one of said members being immovably attached to said cylinder and the other of said members being connected with said rod, and resilient means urging said members into engagement when no fluid pressure is applied to said cylinder.

15. The combination set forth in claim 11 wherein the means for releasing the locking means includes a lock release cylinder and a lock release piston disposed therein for linear movement under the urge of fluid pressure.

16. A dual drive actuator including in combination, a cylinder having a lineally movable piston disposed therein capable of fluid pressure actuation in either direction, releasable locking means operatively associated with said piston for preventing movement of said piston when no fluid pressure is exerted thereon, and auxiliary driving means operatively connected to said piston for effecting linear movement thereof in either direction in lieu of fluid pressure actuation, the operative connection between said piston and said auxiliary means including a hollow member disposed in said cylinder for rotation relative to said piston, the said locking means in the locked condition and a member operatively connected with said piston so as to move lineally therewith, said member extending longitudinally through and operatively engaging said hollow member whereby relative rotation will occur between said members upon linear movement of said piston, said driving means, when inactive, maintaining said locking means operative to prevent piston movement in the absence of fluid pressure application to said cylinder and, when active, operative to rotate one of said members.

17. An actuator assembly including, in combination, a cylinder, a reciprocative piston in said cylinder, a hollow member rotatably journaled in said cylinder and normally restrained against rotation, said hollow member being operatively connected to said piston, the operative connection between said piston and member including an element rotatably journaled in said piston but movable lineally therewith, said element extending through said hollow member and operatively engaging the same whereby relative rotation will occur between said element and member in response to reciprocative movement of said piston, and releasable locking means operatively associated with said element for restraining rotation of said element and, consequently, preventing reciprocative movement of said piston when the actuator is inactive.

18. A dual drive actuator including, in combination, a cylinder, a reciprocable piston disposed in said cylinder capable of fluid pressure actuation in either direction, a rotatable member disposed in said cylinder and operatively connected with said piston such that said member will rotate in response to movement of said piston, and auxiliary driving means operatively associated with said member for effecting rotation thereof to effect reciprocative movement of the piston in lieu of fluid pressure actuation.

19. A dual drive actuator including, in combination, a cylinder, a reciprocable piston disposed in said cylinder capable of fluid pressure actuation in either direction, a first member disposed in said cylinder and operatively connected to said piston, a second member operatively engaging said first member, said first and second members being adapted for rotation relative to each other upon movement of said piston, and auxiliary driving means operatively associated with said members for effecting relative rotation therebetween to effect reciprocative movement of the piston in lieu of fluid pressure actuation.

20. A dual drive actuator including, in combination, a cylinder, a piston in said cylinder capable of fluid pressure actuation in either direction, releasable locking means operatively associated with said piston for preventing movement of said piston when no fluid pressure is exerted thereon, and auxiliary means operatively connected to said piston for effecting linear movement thereof in either direction with the locking means in the locked condition.

HOWARD M. GEYER.

References Cited in the file of this patent

UNITED STATES PATENTS

| Number | Name | Date |
|---|---|---|
| 2,288,076 | Erling | June 30, 1942 |
| 2,349,244 | Brown | May 23, 1944 |
| 2,434,828 | Ashton et al. | Jan. 20, 1948 |
| 2,442,577 | Ashton | June 1, 1948 |
| 2,476,376 | Laraque | July 19, 1949 |